US009509841B2

(12) United States Patent
Tovino et al.

(10) Patent No.: US 9,509,841 B2
(45) Date of Patent: *Nov. 29, 2016

(54) DIRECTORY FEATURES IN A DISTRIBUTED TELEPHONY SYSTEM

(71) Applicant: ShoreTel, Inc., Sunnyvale, CA (US)

(72) Inventors: Michael S. W. Tovino, Bend, OR (US); Richard A. Winslow, San Jose, CA (US); Glen K. Okita, Los Altos, CA (US)

(73) Assignee: Shortel, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/146,703

(22) Filed: Jan. 2, 2014

(65) Prior Publication Data

US 2014/0119529 A1    May 1, 2014

Related U.S. Application Data

(63) Continuation of application No. 11/110,293, filed on Apr. 19, 2005, now Pat. No. 8,670,544.

(51) Int. Cl.
*H04M 3/42* (2006.01)
*G06F 17/30* (2006.01)
*H04M 3/493* (2006.01)
*H04M 7/00* (2006.01)

(52) U.S. Cl.
CPC ......... *H04M 3/4931* (2013.01); *H04M 7/0015* (2013.01)

(58) Field of Classification Search
CPC .. H04M 3/4831; H04M 3/4935; H04M 3/54; H04M 3/436; H04M 1/72519; H04M 1/72583; G06F 17/30864; G06F 17/30867

USPC ........ 379/218.01, 211.01; 455/566; 707/705, 707/758, 781

See application file for complete search history.

(56) References Cited

U.S. PATENT DOCUMENTS

| | | |
|---|---|---|
| 4,608,460 A | 8/1986 | Carter et al. |
| 4,817,129 A | 3/1989 | Riskin |
| 6,192,123 B1 | 2/2001 | Grunsted et al. |
| 6,493,324 B1 | 12/2002 | Truetken |
| 6,687,242 B1 | 2/2004 | Enzmann et al. |
| 6,853,716 B1 | 2/2005 | Shaffer et al. |
| 7,177,415 B1 | 2/2007 | Kim et al. |
| 7,441,002 B1 | 10/2008 | Catchpole et al. |

(Continued)

OTHER PUBLICATIONS

ShoreTel, Inc., Call Manager: Online Help, dated 2002, 4 pages.

(Continued)

*Primary Examiner* — Oleg Asanbayev
(74) *Attorney, Agent, or Firm* — Tarolli, Sundheim, Covell & Tummino LLP

(57) ABSTRACT

A telephony system is presented that enables a phone to access a directory and use the directory in conjunction with other phone functions. The system includes a server with a telephony management software (TMS) unit, a telephony application programming interface (TAPI) unit, and an application unit. The application unit includes a control module, a function module, a filter module, a presentation module, a phone interface module, and a storage interface module. A server sends a signal to a phone regarding the contents of a directory. A server also enables a user to navigate through the directory, filter the directory, and perform call functions on phone numbers associated with directory entries.

20 Claims, 11 Drawing Sheets

(56) References Cited

U.S. PATENT DOCUMENTS

| | | |
|---|---|---|
| 2002/0152203 A1 | 10/2002 | Ostergaard et al. |
| 2003/0018638 A1 | 1/2003 | Abe et al. |
| 2003/0039347 A1 | 2/2003 | Katou |
| 2003/0161458 A1 | 8/2003 | Da Palma et al. |
| 2005/0086259 A1 | 4/2005 | Eschbach et al. |

OTHER PUBLICATIONS

ShoreTel, Inc., Datasheet: Personal Call Manager /Advanced Call Manager , dated 2005 [online retrieved on Jul. 13, 2005] Retrieved from the Internet <URL:http://www.shoretel.com/STCorp/products/documents/ST-Dsheet-CallMgr.pdf>, 2 pages.

ShoreTel, Inc., Products: Desktop Productivity Applications, dated 2005 [online retrieved on Jul. 13, 2005] Retrieved from the Internet <URL: http://www.shoretel.com/STCorp/products/productivity.aspx>, 5 pages.

ShoreTel, Inc., Datasheet: Operator Call Manager, dated 2005 [online retrieved on Jul. 13, 2005] Retrieved from the Internet <URL:http://www.shoretel.com/STCorp/products/documents/STCorp/products/documents/ST-Dsheet-Operator.pdf>, 2 pages.

ShoreTel, Inc., Products: Operator, dated 2005 [online retrieved on Jul. 13, 2005] Retrieved from the Internet <URL:http://www.shoretel.com/STCorp/products/operator.aspx>, 6 pages.

ShoreTel, Inc., Datasheet: ShorePhone Telephones, dated 2005 [online retrieved on Jul. 2005] Retrieved from the Internet <URL:http://www.shoretel.com/STCorp/products/documents/STCorp/products/documents/ST-Dsheet-Telephones.pdf>, 2 pages.

ShoreTel, Inc., Products: Telephones: Key Features, dated 2005 [online retrieved on Jul. 13, 2005] Retrieved from the Internet <URL:http://www.shoretel.com/STCorp/products/telephones-features.aspx>, 9 pages.

ShoreTel, Inc., Welcome to the Shoretel Call Manager Tutorial, [online retrieved on Jul. 1, 2005] Retrieved from the Internet <URL:http://www.shoretel.com/STCorp/training/CMCBT/home.htm>, 1 page.

ShoreTel, Inc., Placing a Call Using the QuickDialer, [online retrieved on Jul. 1, 2005] Retrieved from the Internet <URL:http://www.shoretel.com/STCorp/training/CMCBT/basic_outbound_call.htm>, 2 pages.

ShoreTel, Inc., Transferring Calls Using Blind Transfer, [online retrieved on Jul. 1, 2005] Retrieved from the Internet <URL:http://www.shoretel.com/STCorp/training/CMCBT/basic_transfer_blind.htm>, 2 pages.

ShoreTel, Inc., Adding Another Person to an Active Conference Call, [online retrieved on Jul. 1, 2005] Retrieved from the Internet <URL:http://www.shoretel.com/STCorp/training/CMCBT/basic_conf_addperson.htm>, 2 pages.

ShoreTel, Inc., Parking a Call, [online retrieved on Jul. 1, 2005] Retrieved from the Internet <URL:http://www.shoretel.com/STCorp/training/CMCBT/basic_toolbar_park.htm>, 2 pages.

ShoreTel, Inc., Opening the Quick Dialer, [online retrieved on Jul. 1, 2005] Retrieved from the Internet <URL:http://www.shoretel.com/STCorp/training/CMCBT/basic_adv_quickdial.htm>, 2 pages.

DIRECTORY FEATURES IN A DISTRIBUTED TELEPHONY SYSTEM

CROSS-REFERENCE TO RELATED APPLICATIONS

This application is a continuation of and claims priority under 35 USC §120 to U.S. application Ser. No. 11/110,293, filed Apr. 19, 2005, entitled "Directory Features in a Distributed Telephony System," the contents of which are incorporated herein by reference in its entirety.

Applicants hereby rescind any disclaimer of claim scope in the parent application (namely U.S. application Ser. No. 11/110,293) or the prosecution history thereof and advise the US Patent and Trademark Office (USPTO) that the claims in this continuation application may be broader than any claim in the parent application. Accordingly, Applicants notify the USPTO of a need to re-visit the disclaimer of claim scope in the parent application, and to further re-visit all prior art cited in the parent application, including but not limited to cited references over which any disclaimer of claim scope was made in the parent application or the prosecution history thereof. See Hakim v. Cannon Avent Group, PLC, 479 F.3d 1313 (Fed. Cir. 2007). Moreover, any disclaimer made in the current application should not be read into or against the parent.

TECHNICAL FIELD

This invention relates generally to distributed telephony and, more particularly, to features associated with a directory accessed using a phone

BACKGROUND

Telephones have been in use for over a century. Over that time, the length of each telephone number, in addition to the total amount of telephone numbers, has steadily increased. As a result, callers have had to use more and longer phone numbers.

A caller will often know the name of the person she wants to reach but not his phone number. In order to determine the phone number, the caller can consult a directory or phone book, which lists people's phone numbers in order based on their names. Initially, such directories existed in paper form. Later, they became available via automated voice messaging systems (such as voicemail). Recently, directories have become electronic, such as software applications running on a computer or personal digital assistant (PDA).

While a caller can use various devices to access an electronic directory, it is most convenient if she can use her phone to access the directory. For example, the caller could use her phone to determine a person's phone number and then use the phone again to call the person or execute another desired function. What is needed is a directory that can be accessed using a phone and that is integrated with other phone functions such as Dial, Transfer, Conference, Pickup, Park, and Unpark.

SUMMARY OF THE INVENTION

Computer-integrated functionality is implemented using a server in a distributed telephony environment. The server includes a telephony management software (TMS) unit, a telephony application programming interface (TAPI) unit, and an application unit, which are communicatively coupled. The server is coupled to one or more endpoints, such as analog phones, IP-based phones, and software phones. The server is also coupled to one or more software applications that control these endpoints. These software applications can be, for example, desktop software applications employed by end-users to perform specific tasks or server-side applications that enable higher levels of functionality.

In one embodiment, an application unit enables a phone to access a directory and use the directory in conjunction with other phone functions. The application unit can include several interconnected modules, such as a control module, a function module, a filter module, a presentation module, a phone interface module, and a storage interface module.

A phone is associated with a directory. In one embodiment, a directory includes one or more entries, an entry includes one or more fields, and a field includes no more than one value. A server receives a directory request from the phone and sends a signal to the phone. This signal causes the phone to display information from the directory. In one embodiment, the phone displays one or more field values of one or more directory entries. For example, the phone displays, for each directory entry, the person's name and phone number.

In one embodiment, the directory is integrated with other phone functions, such as Dial, Transfer, Conference, Pickup, Park, and Unpark. In this embodiment, a user can specify a directory entry and a call function (in either order), and the call function will be performed using a phone number from the directory entry. For example, a user can navigate to a directory entry and then instruct the phone to dial a phone number from the entry. Similarly, a user can navigate to a directory entry and then instruct the phone to transfer an active or held call to a phone number from the entry.

In one embodiment, a phone enables a user to filter the directory so that only information from particular entries is displayed. In general, a user can filter the directory by specifying one or more filters for one or more fields of an entry. Then, only information from entries matching those criteria will be displayed. In one embodiment, a filter comprises one or more characters, where a character can be a digit (0-9), an asterisk (*), or a hash mark (#). In one embodiment, an entry satisfies a filter if a field value of the entry begins with the filter. In order to accommodate field values with alphabetic characters, in one embodiment, a numeric filter character between 2 and 9 (inclusive) matches not only that number, but also the alphabetic characters that are usually on the corresponding phone key. For example, the filter character "2" matches not only "2" but also "a", "b", and "c".

Further features of the invention, its nature, and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

DETAILED DESCRIPTION OF THE EMBODIMENTS

Figure 1:
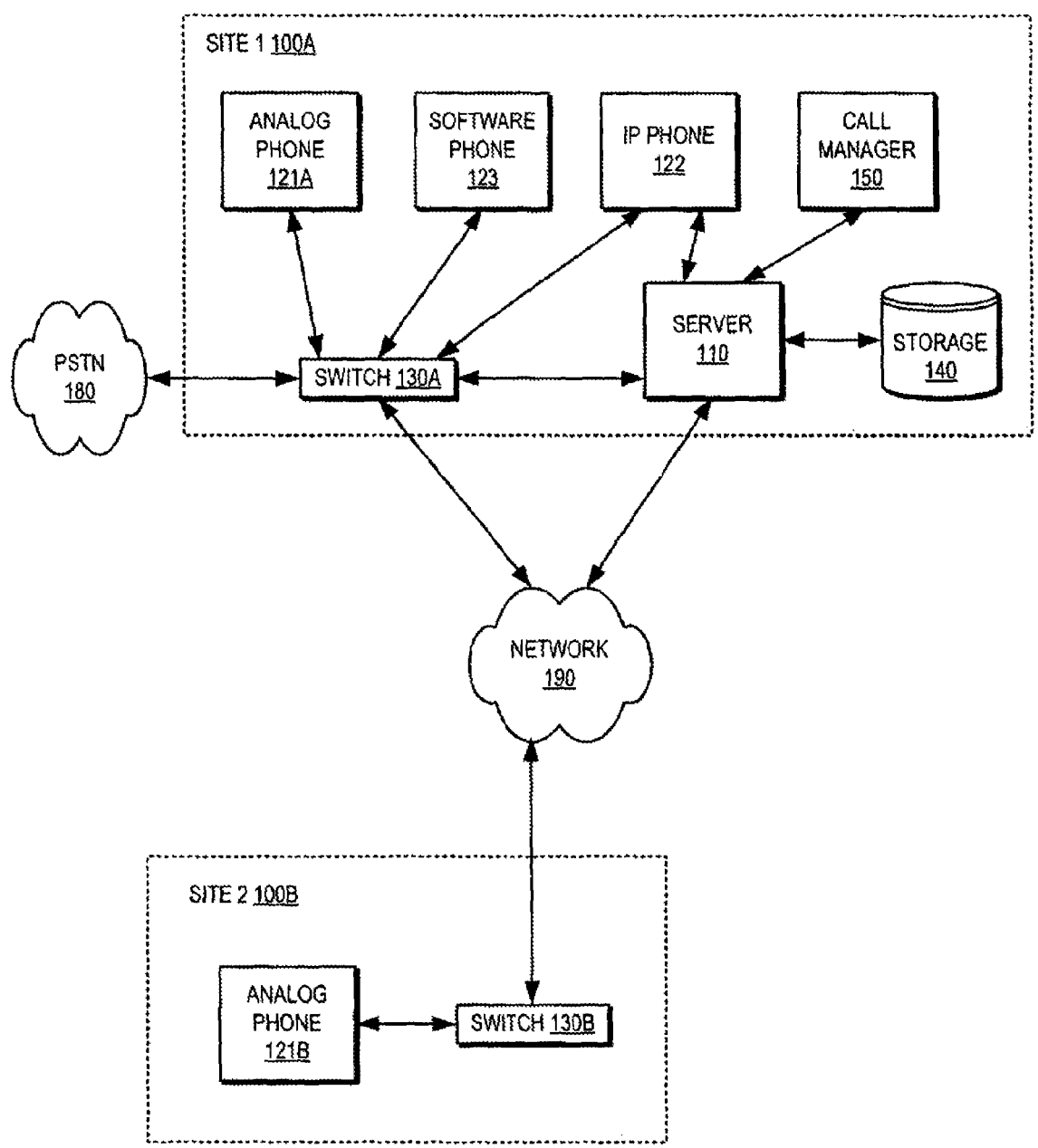
FIG. 1 illustrates a block diagram of a distributed telephony system architecture, according to one embodiment of the present invention.

The present invention is now described more fully with reference to the accompanying figures, in which several embodiments of the invention are shown. The present invention can be embodied in many different forms and should not be construed as limited to the embodiments set forth herein. Rather, these embodiments are provided so that this disclosure will be thorough and complete and will fully convey the invention to those skilled in the art.

One skilled in the art will recognize that methods, apparatus, systems, data structures, and computer readable media implement the features, functionalities, or modes of usage described herein. For instance, an apparatus embodiment can perform the corresponding steps or acts of a method embodiment.

A. Overview of Directory Features

A phone enables a user to access a directory. A directory comprises one or more entries, and an entry comprises one or more fields. In one embodiment, entry fields for a person fall into three categories: name fields (e.g., first name, middle name, last name), work fields (e.g., company name, phone number, cell phone number, fax number, pager number, street address, and email address), and personal fields (e.g., phone number, cell phone number, fax number, pager number, street address, and email address). In one embodiment, a field can have no more than one value, and this value can be a string of characters (including, e.g., letters, numbers, and/or symbols).

In one embodiment, when a user accesses the directory, the phone displays a portion of the directory. For example, the phone displays information from one or more entries. This information can be an entire entry or a portion thereof (e.g., the values of only the name fields or the values of only the name fields and work phone number field). If the directory has too many entries for all of their information to be displayed at once, the user can navigate within the directory so that information from different directory entries is displayed. If an entry contains more information than that which is displayed, the user can select the entry to view the additional information.

In one embodiment, directory access via phone can be customized in various ways. This includes, for example, which information is displayed for each entry (e.g., which fields) and which directory should be accessed (e.g., if more than one were available). Customizations can be specified, for example, by using the device itself or by using a software application that runs on a general-purpose computer, such as a server.

In one embodiment, the directory is integrated with other phone functions. For example, if a directory entry is selected, a phone number from the entry can be automatically input into a phone function such as Dial, Transfer, Conference, Pickup, Park, or Unpark. Since the phone number is input automatically, it is unnecessary for the user to enter it herself. In one embodiment, the user first navigates to an entry and then specifies a function. For example, the user can navigate to an entry and then instruct the phone to dial a phone number in that entry. In another embodiment, the user first specifies a function and then navigates to an entry. For example, the user can instruct the phone to transfer a call and then navigate to an entry containing a phone number. The call will then be transferred to that phone number.

If the directory contains several entries, it can be time-consuming to navigate to the desired entry. In one embodiment, a phone enables a user to "filter" the directory so that only information from particular entries is displayed, thereby decreasing the size of the directory portion that is available for navigation. For example, the directory could be filtered to display only information from entries where the person's first name starts with the letter "M." As another example, the directory could be filtered to display only information from entries where the person works at a specific company. In general, a user can filter the directory by specifying one or more filters for one or more fields of a directory entry. Then, only information from entries matching those criteria will be displayed. Filtering will be further discussed below.

In general, directory features are implemented as follows: A directory is stored, for example, on a server. A phone is associated with the directory. When a user provides input to the phone (e.g., via a touchscreen, microphone, dedicated key, or soft key), a signal is sent from the phone to a server. (This server may or may not contain the associated directory.) The signal causes the server to perform certain actions. These actions can include, for example, sending a signal to the phone (e.g., to cause information to be displayed) or sending a signal to a switch (e.g., to perform a call function (e.g., Dial, Transfer, Conference, Pickup, Park, or Unpark)). Specific examples of signals sent from the phone to the server and actions performed by the server will be discussed below.

B. System Architecture

Enterprises often have several offices or call centers that are located in a plurality of disparate locations. To interconnect all of these sites, enterprise telephony systems have been developed. Enterprise telephony systems, which comprise a distributed set of voice switches and servers, offer enterprise applications enabled by the integration of computer systems with telephony services. The software that supports the computer-integrated functionality is generally implemented as a client-server environment in which the participants or clients (distributed telephony users) communicate with a server. Computer-integrated features rely not only on a server's application platform but also on the availability of the network that connects the switches, servers, and application services.

FIG. 1 illustrates a block diagram of a distributed telephony system architecture, according to one embodiment of the present invention. The illustrated embodiment of architecture 195 includes a first site 100A and a second site 100B. As used herein, a site represents a grouping of resources. In the illustrated embodiment, the two sites 100A, 100B are communicatively coupled via a network 190. One skilled in the art will note that sites 100A, 100B can be physically distinct from each other or merely topology-related groupings that are not in physically distinct locations. The system 195 architecture in FIG. 1 is used only by way of example. While FIG. 1 illustrates two sites, the present invention applies to any system architecture containing one or more sites.

The first site 100A includes a server 110, a switch 130A, three endpoints (analog phone 121A, IP phone 122, and software phone 123), a device running a call manager software application 150, and a storage device 140. The switch 130A represents a Voice over Internet Protocol (VoIP) device to which a number of endpoints can be coupled, such as analog phones 121, IP phones 122, and software phones (softphones) 123. In the illustrated embodiment, the switch 130A is coupled to the network 190. The switch 130A is also coupled to the public switched telephone network (PSTN) 180 via an analog or digital trunk line (e.g., a T1 or E1 interface). In the illustrated configuration, the switch 130A provides an interface for calls originating from or terminating on the PSTN 180.

An endpoint enables a user to carry on a phone call. Although in the illustrated embodiment the first site 100A has three endpoints (one analog phone 121A, one IP phone 122, and one softphone 123), in other embodiments the first site 100A has different numbers and types of endpoints. An endpoint is coupled to a switch 130, a server 110, or both.

An endpoint has a user interface to send data to and receive data from a user. The analog phone 121A has, for example, a Telephone User Interface (TUI) that sends data through a speaker and receives data through a microphone and a keypad. The IP phone 122 has, for example, both a TUI and a graphical user interface that sends data through a display device associated with the IP phone 122. In one embodiment, the IP phone's graphical user interface also receives data from a touchscreen display device associated with the IP phone 122. The softphone 123 has, for example, a software application that runs on a computer and sends data through a display device and a speaker and receives data through a microphone, a keyboard, and a pointing device.

A device running a call manager software application 150, such as a computer, controls one or more endpoints with which it is associated. Call manager 150 offers a user an interface through which he can perform call-related functions.

Although in the illustrated embodiment the first site 100A has only one call manager 150, in other embodiments the first site 100A has a different number of call managers 150. Also, more than one call manager 150 can control the same endpoint. The association between a call manager 150 and an endpoint that it controls is accessed through the server 110.

The server 110 is configured to implement features or functions of the present invention. The server 110 is coupled to the network 190 and can also be coupled to one or more endpoints, such as IP phone 122 and softphone 123. The server 110 will be further discussed below with reference to FIGS. 2-6.

The storage device 140 contains directory information, including directory entries and associations between directories and phones. In one embodiment, the storage device 140 also contains information regarding the directory context of a phone. Alternatively, this information can be stored in the server 110. In one embodiment, directory context information includes one or more of the following: 1) a portion of a directory that is currently available for presentation (the portion could include, e.g., information from all entries versus information from entries that meet certain criteria); 2) a filter (if any) that was used to determine the entries in (1); 3) of the entries in (1), which entries are currently being presented by the phone; 4) of the entries in (3), which entry is currently navigated to; 5) what call function (if any) the directory was invoked during. Note that since the directory context specifies the information presented by the phone, storing the directory context enables later determination of what information is being presented by the phone.

Also, note that directory context information need not include all items (1)-(5). For example, if the entire directory and the filter (2) are known, the directory portion available for presentation (1) can be determined. Directory context information will be further explained below. In the illustrated embodiment, the storage device 140 is directly coupled to the server 110. In an alternate embodiment, the storage device 140 is coupled to the server 110 via the network 190.

One skilled in the art will appreciate that additional networking devices (not shown) can be added to the first site 100A, for example, if needed to support additional endpoints, servers 110, or other systems. For example, the first site 100A can include a second switch 130 and an edge router to couple the first site 100A to the network 190 and to provide local area connectivity for the first and second switches 130A, 130B. One skilled in the art will also recognize that numerous configurations of switches 130 and communications links are contemplated. For example, PSTN links can be coupled to multiple switches 130 at several points within the topology and softswitches 130 can also be used.

The second site 100B similarly includes an endpoint (analog phone 121B) and a switch 130B. The configuration of the second site 100B demonstrates that a server is not required for each site. Switch 130B of the second site 100B can be managed by server 110 that is illustrated in the first site 100A. A call can involve more than one switch. For example, a call that originates from the PSTN 180 and terminates on an endpoint that is communicatively coupled to switch 130B of the second site 100B involves two switches: switch 130A of the first site 100A and switch 130B of the second site 100B. In addition, each switch 130 can be managed by a different server 110.

In one embodiment of the present invention, the network 190 is a partially public or a wholly public network such as the Internet. The network 190 can also be a private network or include one or more distinct or logical private networks (e.g., virtual private networks or wide area networks). Additionally, the communication links to and from the network 190 can be wireline or wireless (i.e., terrestrial- or satellite-based transceivers). In one embodiment of the present invention, the network 190 is an IP-based wide or metropolitan area network.

C. Server Architecture

Figure 2:
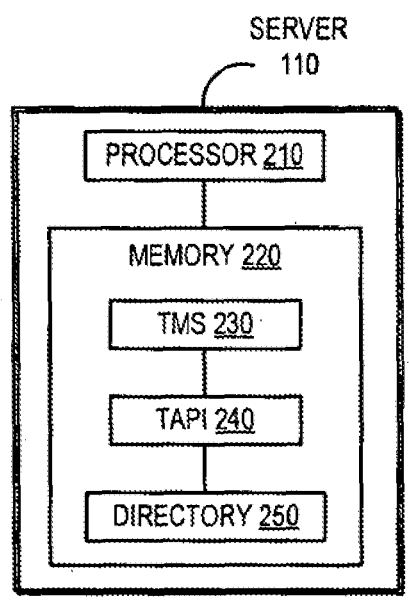
FIG. 2 illustrates a block diagram of a server architecture, according to one embodiment of the present invention.

FIG. 2 illustrates a block diagram of a server architecture, according to one embodiment of the present invention. In this embodiment, server 110 is configured to implement features or functions of the present invention. Server 110 includes a processor 210. The processor 210 can be a conventional processing device, such as a general-purpose microprocessor.

Server 110 also includes a memory 220. The memory 220 includes program instructions or functional units that implement features of the present invention. Specifically, the memory 220 includes a telephony management software (TMS) unit 230 and a telephony application programming interface (TAPI) unit 240.

In one embodiment, the memory 220 also includes one or more application units that interact with the TMS unit 230 and the TAPI unit 240 to enable a specific computer-integrated function. An application unit uses the TAPI unit 240 to exchange data with the TMS unit 230. The TMS unit 230 is able to communicate with and manage one or more switches. For example, with reference to FIG. 1, the TMS unit 230 included in the server 110 can manage the switches 130A, 130B. Through the TAPI unit 240, the TMS unit 230 presents an application with a computer-telephony integration (CTI) view of these switches 130A, 130B. This allows the application to manage the switches 130A, 130B. Such switches 130A, 130B can operate without an associated TMS unit 230 if CTI features are not being used.

D. Application Unit Architecture

In the illustrated embodiment, the server 110 includes one application unit-directory unit 250. In general, the directory unit 250 enables a phone to access a directory and use the directory in conjunction with other phone functions. The functionality of the directory unit 250 will be further described below with reference to FIGS. 4-10.

In one embodiment, directory unit 250 is implemented as a service that interacts with TMS unit 230. Communication or data exchange between TMS unit 230 and directory unit 250 is further described with reference to FIG. 3. Although directory unit 250 is illustrated as executing on the server 110, directory unit 250 can be distributed among computing devices as is known to one of skill in the art. For example, the functionality enabled by directory unit 250 can be implemented in a client-server fashion by having the client (user's local system, such as a general-purpose computer or endpoint) perform some functions and having the server 110 (directory unit 250) perform others. As another example, some or all of the functionality enabled by directory unit 250 can be implemented by having a switch 130 perform some or all functions.

Figure 3:
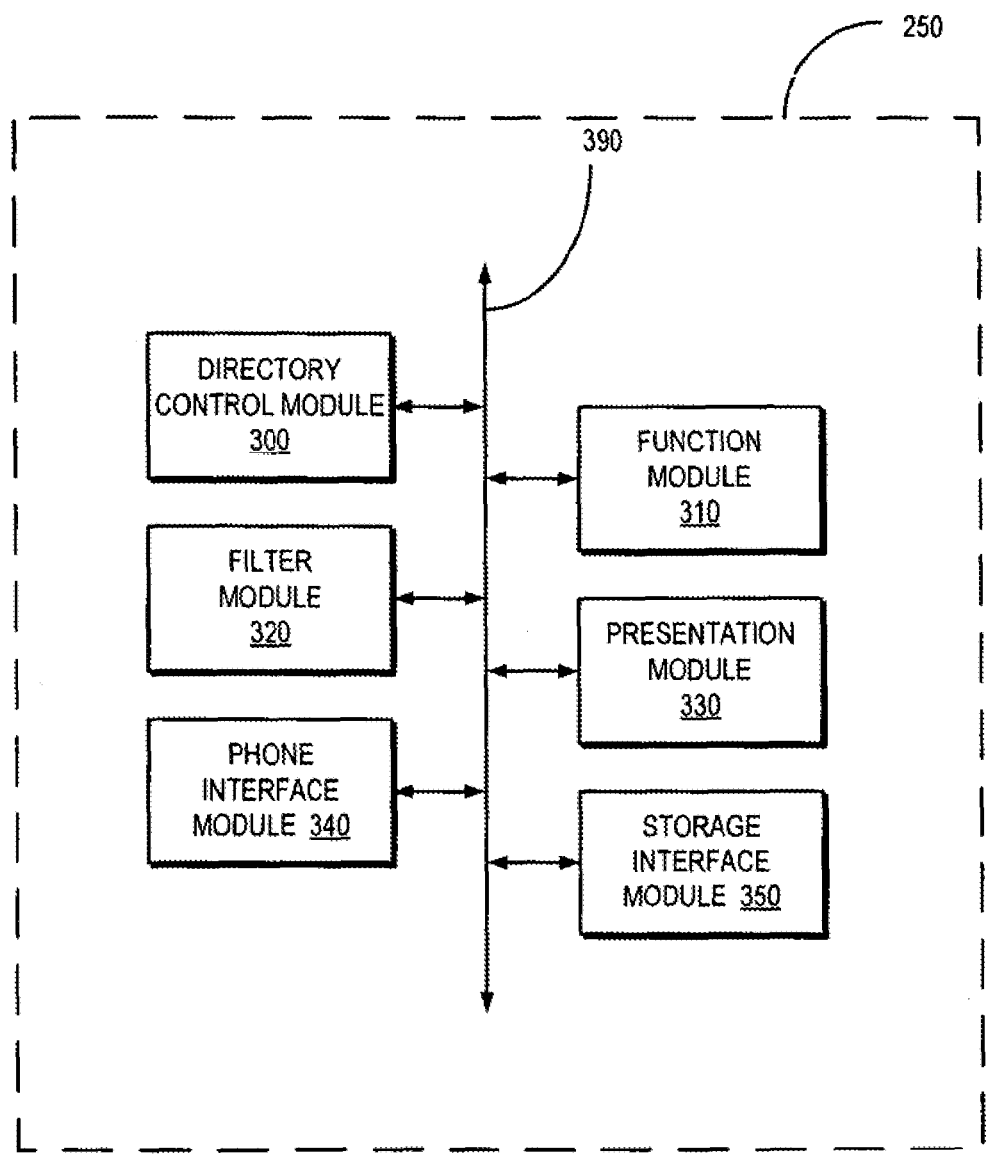
FIG. 3 illustrates a block diagram of a directory unit, according to one embodiment of the present invention.

FIG. 3 illustrates a block diagram of a directory unit, according to one embodiment of the present invention. Generally, directory unit 250 includes several modules for enabling a phone to access a directory and use the directory in conjunction with other phone functions. In the illustrated embodiment, directory unit 250 includes directory control module 300, function module 310, filter module 320, presentation module 330, phone interface module 340, and storage interface module 350. A data bus 390 communicatively couples each of the modules 300, 310, 320, 330, 340, 350.

The modules 300, 310, 320, 330, 340, 350 include program instructions that can be executed on, for example, processor 210 to implement the features or functions of the present invention. The modules 300, 310, 320, 330, 340, 350 are typically stored in a memory, such as memory 220. For server 110, the program instructions can be distributed on a computer-readable medium or storage device 140. The computer-readable storage device 140 can be available via a public network, a private network, or the Internet. Program instructions can be in any appropriate form, such as source code, object code, or scripting code.

Directory control module 300 centrally controls the operation and process flow of directory unit 250, transmitting instructions and data to as well as receiving data from each module 300, 310, 320, 330, 340, 350. Details of its operation will be discussed below with reference to FIGS. 4-10.

Function module 310 assembles a signal to send to a switch 130 that causes the switch 130 to perform a call function (e.g., Dial, Transfer, Conference, Pickup, Park, or Unpark) using a specified phone number.

Filter module 320 determines, given a filter, which entries of a directory satisfy the filter. In one embodiment, a filter comprises one or more characters, where a character can be a digit (0-9), an asterisk (*), or a hash mark (#). In one embodiment, an entry satisfies a filter if a "token" of the entry starts with the filter. For example, an entry containing the token "123" would satisfy a filter of "1" or "12" but would not satisfy a filter of "23". In one embodiment, the filter character "*" acts as a wild card and matches any token character.

In one embodiment, a token is a value of a field in an entry. Recall that, in one embodiment, a field value is a string of characters (including, e.g., letters, numbers, and/or symbols). Thus, in one embodiment, a token is a string of characters. In this embodiment, an entry satisfies a filter if a field value of the entry begins with the filter (but see below regarding field values that contain alphabetic characters).

A user can specify a filter character in a variety of ways. For example, a user can speak the character into a microphone, touch the character on a touchscreen, or activate a button. In one embodiment, a filter character is input using a phone's numeric/symbol keys 500 (0-9, *, #). While some of the field values contain only numeric characters (e.g., cell phone number), some of them also contain alphabetic characters (e.g., first name). In order to accommodate field values with alphabetic characters, in one embodiment, a numeric filter character between 2 and 9 (inclusive) also matches one or more alphabetic characters. In one embodiment, a numeric filter character matches the alphabetic characters that are usually on the corresponding phone key. For example, the filter character "2" matches not only "2" but also "a", "b", and "c". As another example, the filter character "3" matches not only "3" but also "d", "e", and "f".

Recall that an entry can have multiple fields, such as name fields, work fields, and personal fields. The filter "12", used as an example above, filters a directory based on the value of only one field. In one embodiment, a filter can filter a directory based on the values of multiple fields. In this embodiment, the filter character "#" separates a filter into multiple parts, one for each token. For example, the filter "2#3" is satisfied by an entry that has one field value that starts with a "2" (or an "a", "b", or "c") and one field value that starts with a "3" (or a "d", "e", or "f").

In one embodiment, a filter is specified one character at a time. In one embodiment, as each filter character is received, the directory is filtered accordingly. For example, if "2" were specified as a filter, only information from entries containing a field value that started with a "2" (or an "a", "b", or "c") would be displayed. If "3" were then specified, the filter would be "23", and only information from entries containing a field value that started with a "2" (or an "a", "b", or "c") followed by a "3" (or a "d", "e", or "f") would be displayed.

Presentation module 330 assembles a signal to send to a phone that causes the phone to display certain information. In one embodiment, this information includes information from one or more directory entries. In another embodiment, this information can be localized (e.g., using Unicode characters and a Unicode-enabled phone).

In one embodiment, the signal is determined based, in part, on directory context information and information from one or more directory entries. This information is stored in storage device 140 and can be accessed by presentation module 330 using storage interface module 350. Determination of the signal will be further discussed with reference to FIG. 9.

Phone interface module 340 sends data to and receives data from a phone. Phone interface module 340 communicates with the phone either directly or via a switch 130.

Data sent to a phone is assembled by presentation module 330 and causes the phone to display certain information. Data received from a phone comprises information such as, for example, a request to navigate through a directory, a selection of a directory entry, and a request to initiate a function (such as Dial, Transfer, Conference, Pickup, Park, or Unpark). In one embodiment, a signal indicates which phone generated it.

Storage interface module 350 accesses information stored in storage device 140. As described above, storage device 140 contains directory information, including directory entries and associations between directories and phones, and directory context information.

E. Methods

Figure 4:
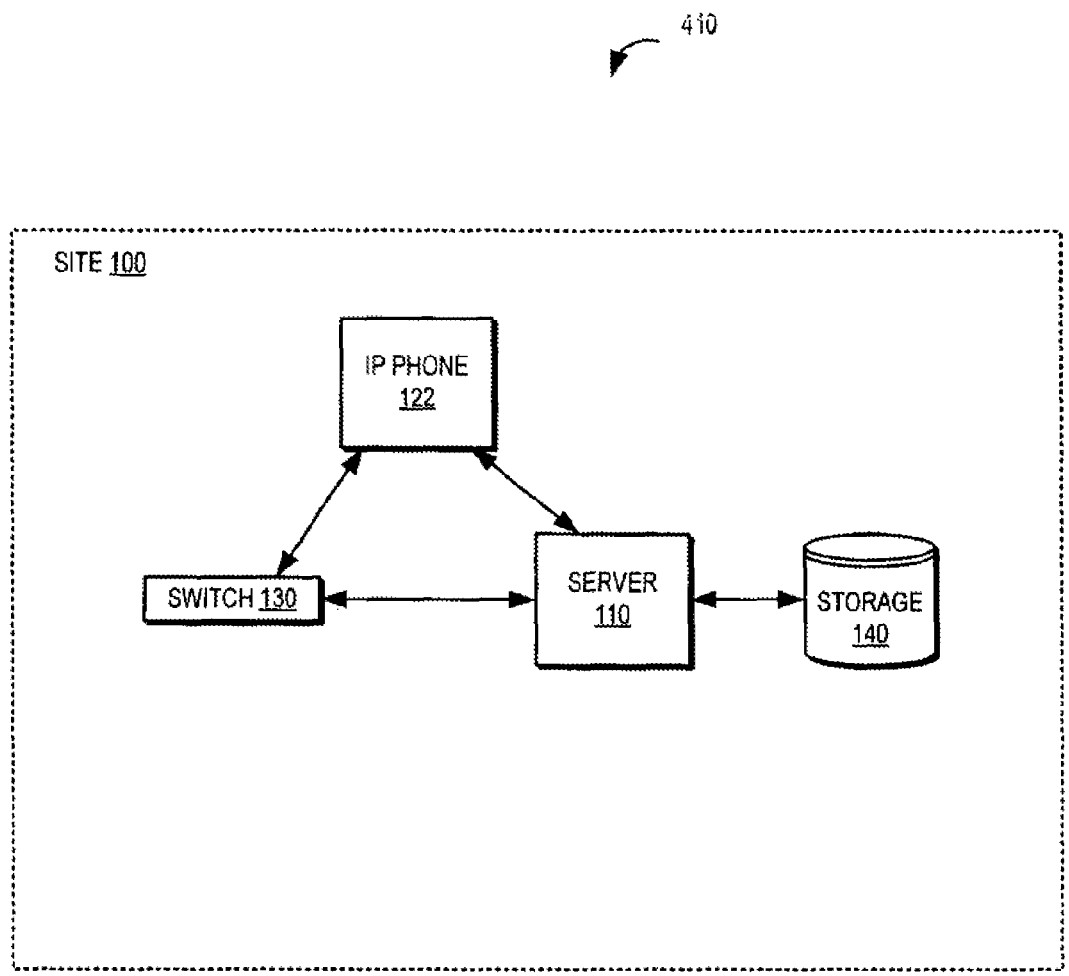
FIG. 4 illustrates a block diagram of a portion of a distributed telephony system architecture, according to one embodiment of the present invention.

Details of modules 300, 310, 320, 330, 340, 350 will be further explained with reference to FIGS. 4-10. FIG. 4 illustrates a block diagram of a portion of a distributed telephony system architecture, according to one embodiment of the present invention. The illustrated embodiment of architecture 400 includes one site 100. Site 100 includes a server 110, an IP phone 122, a switch 130, and a storage device 140. IP phone 122 is coupled to both server 110 and switch 130. Server 110 is also coupled to switch 130 and storage device 140. Server 110, IP phone 122, switch 130, and storage device 140 are similar to how they were described above with reference to FIG. 1.

Figure 5A:
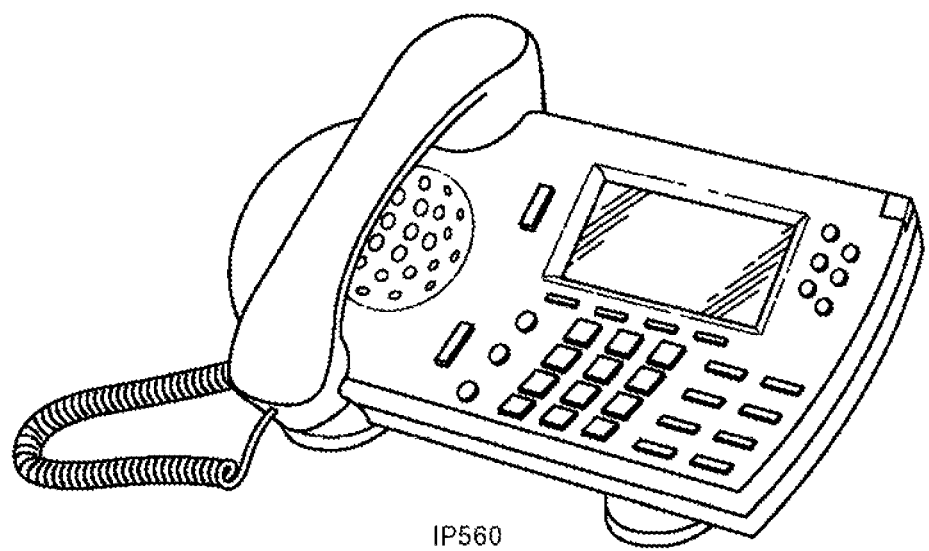
FIG. 5A is a perspective view of an IP phone showing various features, according to one embodiment of the invention.
Figure 5B:
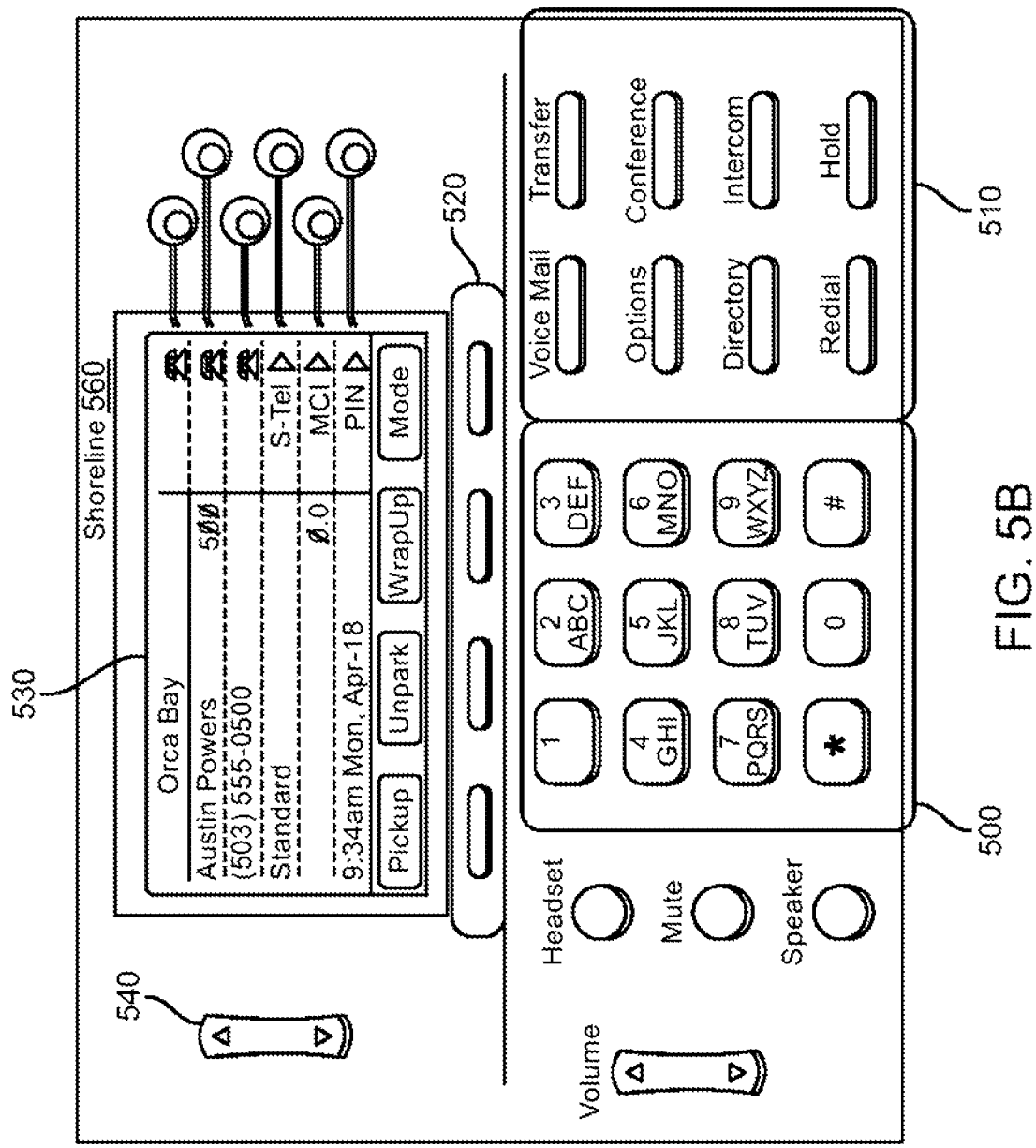
FIG. 5B is a plan view, partially in section, of a portion of the IP phone in FIG. 5A showing a display and various keys, according to one embodiment of the present invention.

In one embodiment, IP phone 122 includes numeric/symbol keys 500, feature keys 510, soft keys 520, a display 530, and a scroll key 540. FIG. 5A is a perspective view of an IP phone showing various features, according to one embodiment of the invention. FIG. 5B is a plan view, partially in section, of a portion of the IP phone in FIG. 5A showing a display and various keys, according to one embodiment of the present invention. In the illustrated embodiment, IP phone 122 is a ShorePhone IP 560 Business Telephone manufactured and sold by ShoreTel, Inc. of Sunnyvale, Calif. In the illustrated embodiment, there are twelve numeric/symbol keys 500 (0-9, *, #), eight feature keys 510 (Voice Mail, Transfer, Options, Conference, Directory, Intercom, Redial, Hold), four soft keys 520, and one scroll key 540. In one embodiment, the functions associated with the soft keys 520 can vary based on configuration, permissions, and/or phone context (e.g., whether the phone is off-hook, whether there is an active call offering, and whether a directory is being presented).

Figure 6:
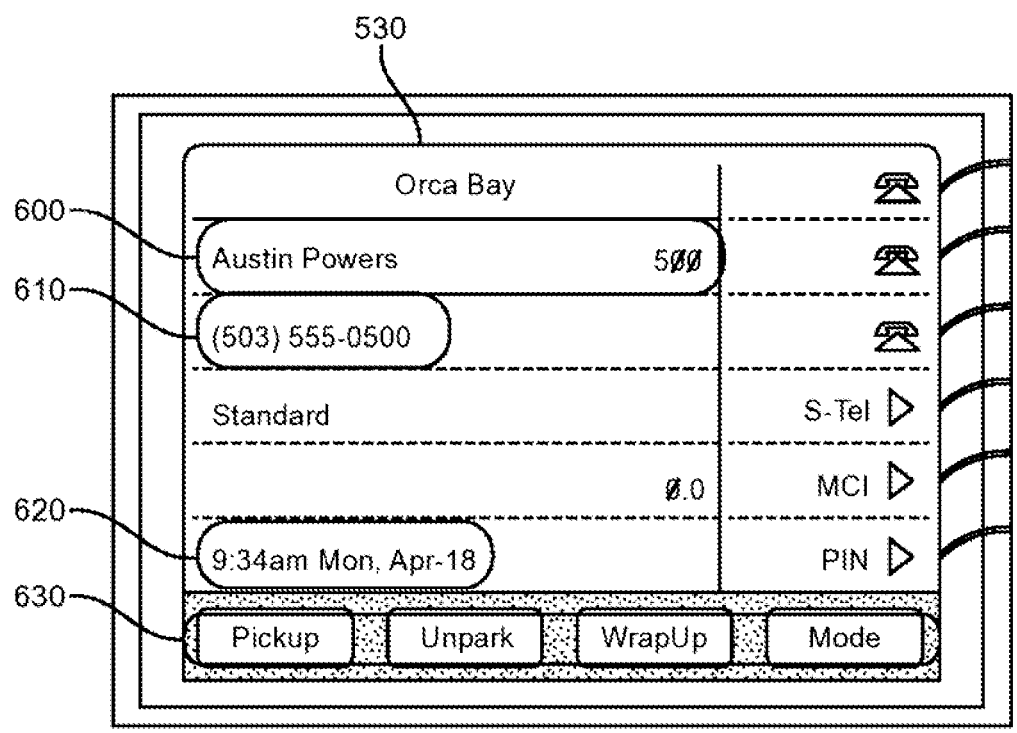
FIG. 6 is a plan view, partially in section, of a portion of the IP phone in FIG. 5A showing a display, keys, and no information from directory entries, according to one embodiment of the present invention.

In the illustrated embodiment, display 530 has a width of twenty-four characters and a height of seven lines. Display 530 has a grayscale resolution of 160 by 80 pixels and is also backlit. In one embodiment, when IP phone 122 is not displaying a portion of a directory, its display 530 includes one or more portions dedicated to display various pieces of information, including the user's name and extension number 600, the user's phone number 610, the time and date 620, and the functions 630 currently associated with the soft keys 520. FIG. 6 is a plan view, partially in section, of a portion of the IP phone in FIG. 5A showing a display, keys, and no information from directory entries, according to one embodiment of the present invention. In the illustrated embodiment, the display 530 includes one or more portions dedicated to display the user's name and extension number 600, the user's phone number 610, the time and date 620, and the functions 630 currently associated with the soft keys 520.

Figure 7:
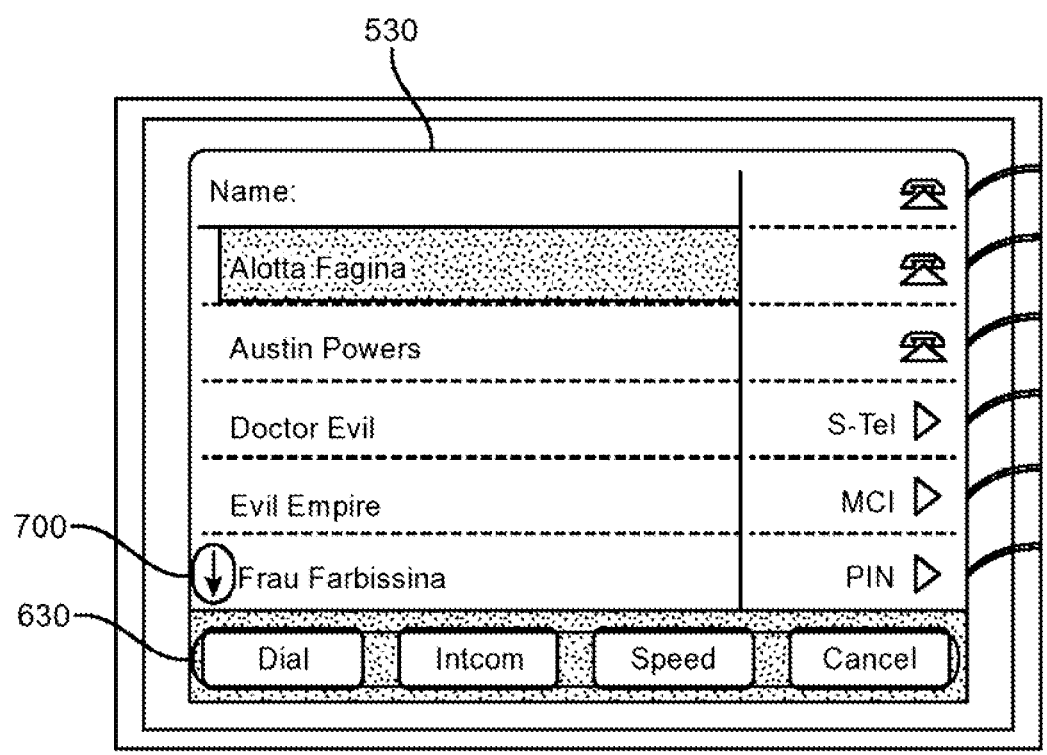
FIG. 7 is a plan view, partially in section, of a portion of the IP phone in FIG. 5A showing a display, keys, and information from five directory entries, according to one embodiment of the present invention.

After a user requests that a directory be displayed (e.g., by providing input via a touchscreen, microphone, dedicated key, or soft key), IP phone 122 displays a portion of the directory. FIG. 7 is a plan view, partially in section, of a portion of the IP phone in FIG. 5A showing a display, keys, and information from five directory entries, according to one embodiment of the present invention. The display 530 includes one or more portions dedicated to display information from one or more directory entries. Information from an entry can include, for example, the entire entry or a portion thereof (e.g., only the person's name or only the person's name and work phone number).

In the illustrated embodiment, an entry includes the following information: first name, last name, work phone number, home phone number, cell phone number, fax phone number, pager phone number, and email address. In the illustrated embodiment, IP phone 122 displays the following information from an entry: first name and last name. In one embodiment, the information from a field can be truncated if it is too long. In the illustrated embodiment, IP phone 122 displays information from five entries.

If multiple entries are presented, a user can navigate among them (e.g., by using a scroll key 540). In one embodiment, when an entry has been navigated to, its appearance is modified by, for example, adding an icon adjacent to the entry information or modifying the display of the entry information. In the illustrated embodiment, information from the entry that has been navigated to appears as light text on a dark background, while information from other entries appears as dark text on a light background.

If more entries exist than are currently being presented, one or more scroll arrows will appear in the display 530. For example, if there are previous entries (e.g., when the entries are in alphabetical order), an "up" scroll arrow will appear. If there are later entries, a "down" scroll arrow 700 will appear. A user can then navigate using the scroll key 540 to view information from different entries.

In one embodiment, IP phone 122 includes keys (for example, feature keys 510 or soft keys 520) associated with the directory. In one embodiment, when a directory entry has been navigated to, activating one of these keys will perform a call function using the phone number of the selected directory entry. For example, activating "Dial" will dial this phone number. As another example, activating "Transfer" will transfer a call to this phone number. Activating "Conference" will conference in this phone number, and activating "Park" will park a call at this phone number. In one embodiment, if the selected entry includes multiple phone numbers (e.g., a work phone number and a home phone number), those numbers will be displayed, and the user will be prompted to select one.

In one embodiment, IP phone 122 includes soft keys 520 associated with the directory. Note that when the directory is not displayed (as in FIG. 6), the functions 630 currently associated with the soft keys 520 are Pickup, Unpark, WrapUp, and Mode. When the directory is displayed (as in FIG. 7), the functions associated with the soft keys 520 are Dial, Intcom (Intercom), Speed, and Cancel. These functions are associated with the directory entries. For example, if a directory entry has been navigated to, activating the Dial soft key 520 will dial the phone number of the selected entry. Activating the Intcom soft key 520 will dial the phone number and automatically connect the caller to the callee's speakerphone. Activating the Cancel soft key 520 will exit the directory.

The previous paragraphs discussed first navigating to an entry and then specifying a call function. But it is also possible to first specify a function and then navigate to an entry. In this situation, the user would activate a key (for example, feature keys 510 or soft keys 520) associated with the desired function. Then, when prompted for the phone number, the user would request a directory. As a result, the directory would be displayed. In one embodiment, call functions that can use a directory in this way include Transfer, Conference, Intercom, Pickup, Unpark, and Park.

Figure 8:
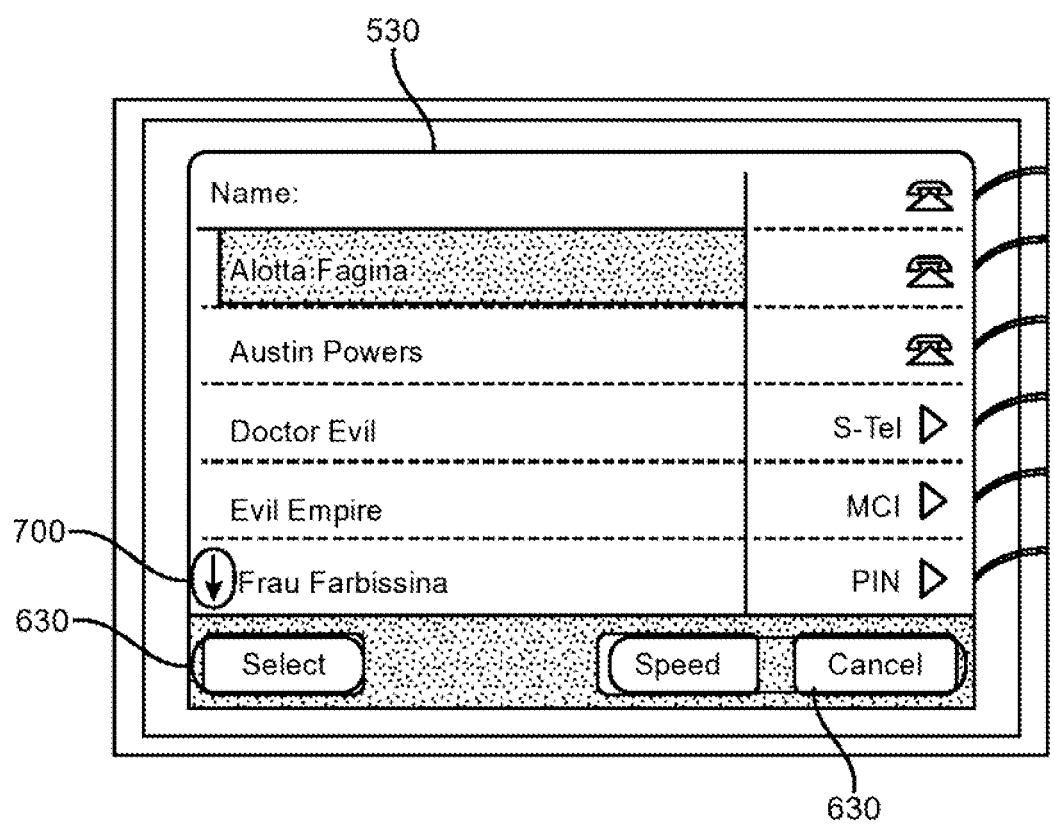
FIG. 8 is a plan view, partially in section, of a portion of the IP phone in FIG. 5A showing a display, keys, and information from five directory entries, according to one embodiment of the present invention.

FIG. 8 is a plan view, partially in section, of a portion of the IP phone in FIG. 5A showing a display, keys, and information from five directory entries, according to one embodiment of the present invention. The illustrated embodiment reflects what would be shown when the user has been prompted for a phone number (for a call function) and has requested a directory. Note that the functions associated with the soft keys 520 have changed from Dial, Intercom, Speed, and Cancel to Select, Speed, and Cancel (where the second soft key 520 has no associated function). After the user has navigated to the desired entry, she presses the Select soft key 520, and control reverts back to the function screen (the screen that initially prompted the user for a phone number). This time, however, the phone number is automatically filled in using the phone number of the selected entry.

Figure 9:
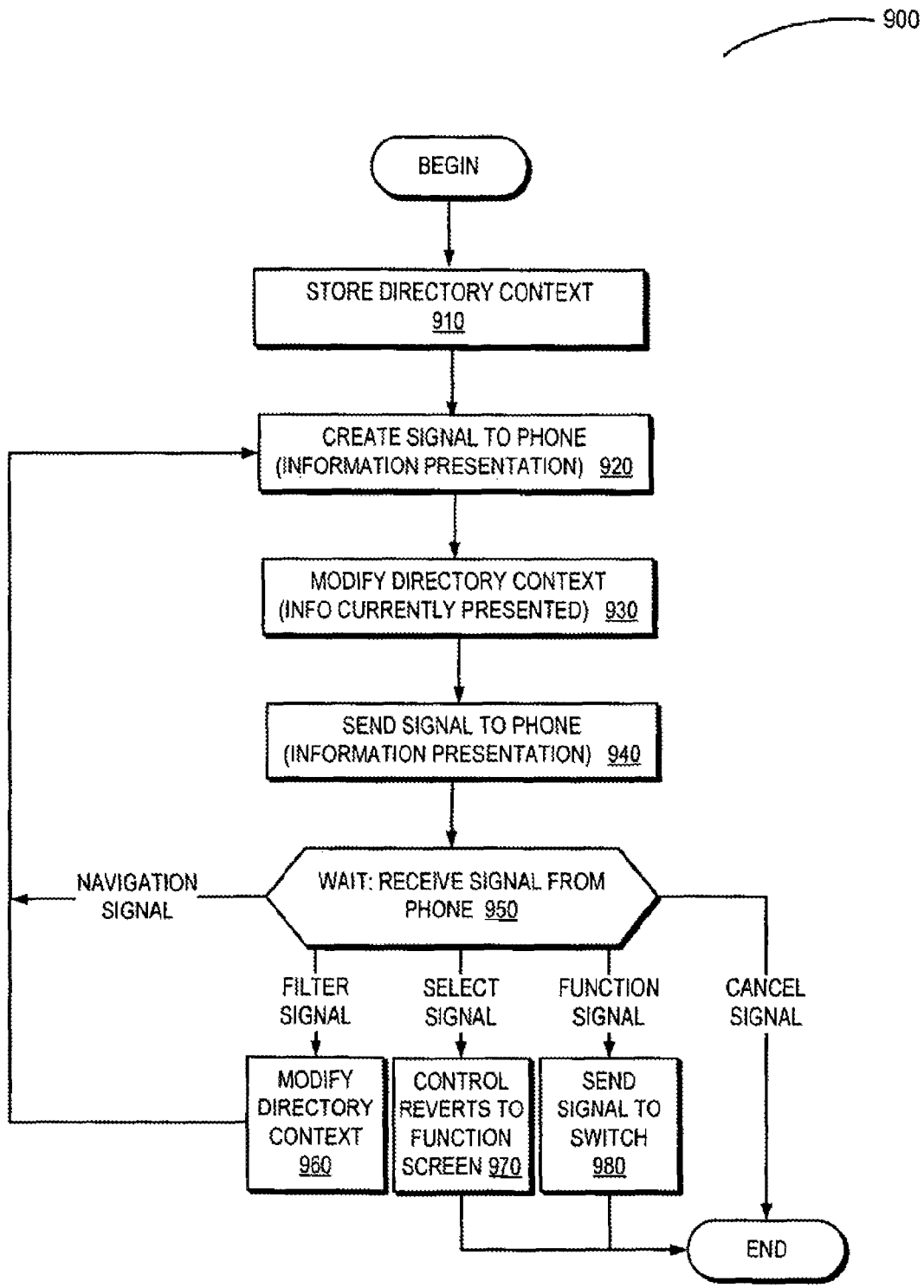
FIG. 9 illustrates a flowchart of a method performed by a server for enabling directory features, according to one embodiment of the present invention.

FIG. 9 illustrates a flowchart of a method performed by a server for enabling directory features, according to one embodiment of the present invention. The method 900 of FIG. 9 is performed if the user has requested a directory using IP phone 122. Method 900 will be explained with reference to FIG. 4, in which IP phone 122 will be used to access a directory and use the directory in conjunction with other phone functions.

Before the method 900 of FIG. 9 begins, server 110 in site 100 receives a signal from IP phone 122 that indicates that the user has requested a directory (e.g., via a touchscreen, microphone, dedicated key, or soft key). Directory control module 300 then stores 910 the directory context using storage interface module 350.

As discussed earlier, in one embodiment, the directory context includes one or more of the following: 1) a portion of a directory that is currently available for presentation (the portion could include, e.g., information from all entries versus information from entries that meet certain criteria); 2) a filter (if any) that was used to determine the entries in (1); 3) of the entries in (1), which entries are currently being presented by the phone; 4) of the entries in (3), which entry is currently navigated to; and 5) what call function (if any) the directory was invoked during.

This information can be determined as follows: In one embodiment, when a user requests a directory, the directory is initially not filtered. Thus, information from all entries is available for presentation, and (1) comprises all entries in the directory. Not filtering the directory is equivalent to filtering it using a wildcard character, which matches any value, so (2) comprises the string "*" (where * is a wildcard character). When a user requests a directory, it is assumed that no portion of the directory is currently being presented. Thus, the portion of the directory that is currently being displayed (3) is equal to the null string " ", as is the entry that is currently navigated to (4). Finally, if the input received from the user prior to the directory request was a call function invocation (such as, e.g., Dial, Transfer, Conference, or Park), the identity of the function (5) is stored. Otherwise, a null string is stored.

Directory control module 300 uses presentation module 330 to create 920 a signal to send to the phone. As discussed above, this signal instructs the phone to display information. The information is determined based on directory information (the identification of a directory and the directory's contents), directory context, and (possibly) an additional value, which will be discussed below. Here, there is no additional value, so the information is determined based on directory information and directory context. Specifically, directory control module 300 determines that, of (1), the phone should present information from the first five entries, since no entries were previously being presented, and information from only five entries can be displayed at once. In one embodiment, the first entry is automatically navigated to.

Directory control module 300 uses storage interface module 350 to modify 930 the directory context (using storage interface module 350) as necessary. For example, the directory context can be modified to reflect one or more of the following: 1) a portion of the directory that is currently available for presentation; 2) a filter that was used to determine the entries in (1); 3) of the entries in (1), which entries are currently being presented by the phone; 4) of the entries in (3), which entry is currently navigated to; and 5) what call function the directory was invoked during. Directory control module 300 uses phone interface module 340 to send 940 the assembled signal to the phone. This signal causes the phone to present to the user a directory (or a portion thereof). Examples of directory presentations were discussed above with reference to FIGS. 7 and 8.

Directory control module 300 instructs phone interface module 340 to wait 950 for a signal from the phone. When a user navigates between directory entries (e.g., by activating a scroll key 540), a navigation signal is sent from the user's phone to server 110. When this signal is received, directory control module 300 uses presentation module 330 to create 920 a signal to send to the phone. Again, this signal instructs the phone to present information. Here, however, the information is determined based on which entries are currently being presented (part 3 of directory context), which entry is currently navigated to, which entries are available for presentation (either part 1 of directory context or a combination of an entire directory and a filter (part 2 of directory context)), and an additional value, which here is the navigation signal (e.g., "up" or "down").

For example, if the signal is "down," the entry following the currently navigated entry will be navigated to. As a result, the appearances of the previously navigated to entry and the newly navigated to entry will change. If the previously navigated to entry was presented last on the display 350 (e.g., the fifth of five presented entries), the next entry available for presentation is determined, and the information presented is scrolled such that the first presented entry is removed, the second through fifth presented entries are moved up, and the next available entry is shown in fifth position. If the signal is "up," the entry preceding the currently navigated to entry will be navigated to. As a result, the appearances of the previously navigated to entry and the newly navigated to entry will change. If the previously navigated to entry was presented first on the display 350 (e.g., the first of five presented entries), the preceding entry available for presentation is determined, and the information presented is scrolled such that the fifth presented entry is removed, the first through fourth presented entries are moved down, and the preceding available entry is shown in first position.

When a user enters a filter symbol (e.g., by activating a 0-9, *, or # key), a filter signal is sent from the user's phone to server 110. When this signal is received, directory control module 300 modifies 960 the directory context (using storage interface module 350) to reflect the filter (part 2 of directory context). Directory control module 300 also uses presentation module 330 to create 920 a signal to send to the phone. Again, this signal instructs the phone to present information. Here, however, the additional value is the filter signal. In this situation, presentation module 330 uses filter module 320 to filter the entries available for presentation (part 1 of directory context). Presentation module 330 then determines a set of five (or fewer) entries to display. In one embodiment, these entries are the first five (or fewer) entries in the list of (filtered) entries available for presentation.

Figure 10:
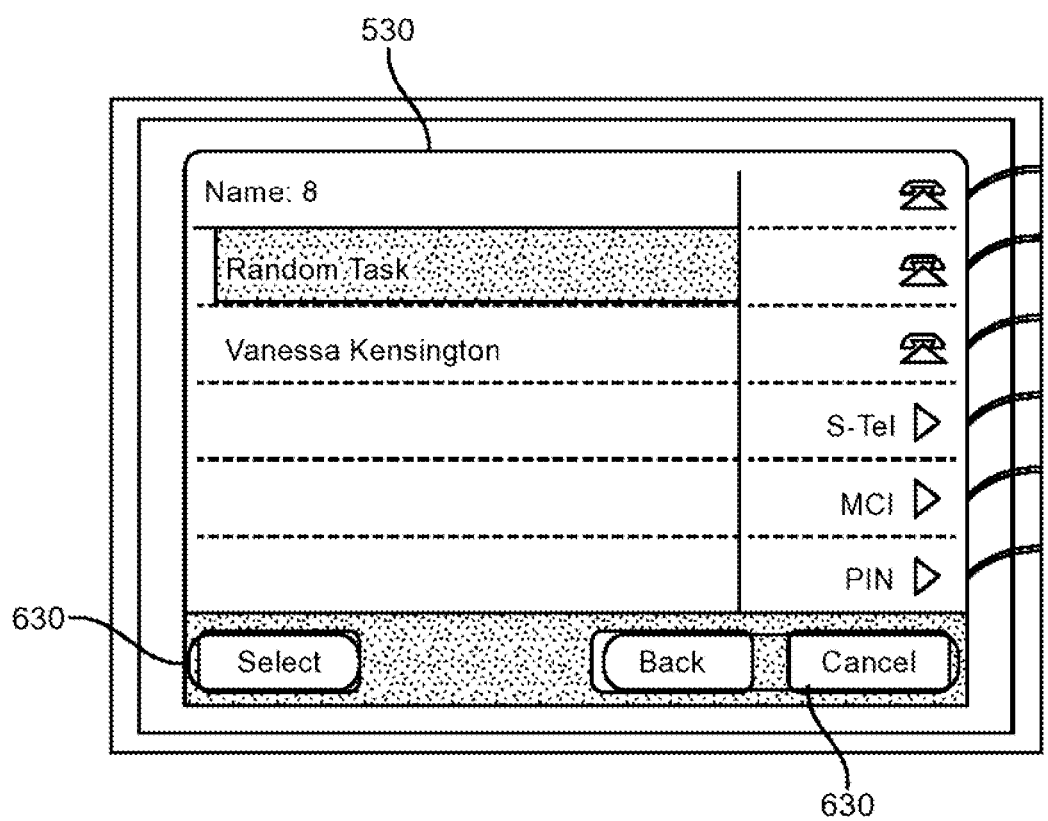
FIG. 10 is a plan view, partially in section, of a portion of the IP phone in FIG. 5A showing a display, keys, and information from two directory entries (because the directory has been filtered), according to one embodiment of the present invention.

FIG. 10 is a plan view, partially in section, of a portion of the IP phone in FIG. 5A showing a display, keys, and information from two directory entries (because the directory has been filtered), according to one embodiment of the present invention. In the illustrated embodiment, the filter symbol is "8", which matches a string (such as a value of an entry field) that starts with "8", "T", "U", or "V". Note that the last name of the first entry starts with a "T", and the first name of the second entry starts with a "V". Also, one of the soft keys is associated with the "Back" function. The Back function modifies the filter to remove the filter character that was most recently entered and re-filters the directory accordingly.

When a user selects a directory entry (e.g., by activating a Select soft key), a select signal is sent from the user's phone to server 110. For example, when a user has been prompted for a phone number (for a call function) and has requested a directory, the directory is presented, and the user selects an entry. A select signal is sent to server 110 that identifies the selected entry. Control reverts back to the function screen (the screen that initially prompted the user for a phone number), where the phone number is automatically filled in using the phone number of the selected entry. The function can be determined based on the directory context (specifically, part 5). Directory control module 300 ends execution.

When a user selects a call function (e.g., by activating a Dial or Intcom soft key), a function signal is sent from the user's phone to server 110. For example, when a user has requested a directory without having been prompted for a phone number, the directory is presented, and the user navigates to an entry. The user then specifies a call function to execute (e.g., by activating a soft key). A function signal is sent to server 110 that identifies the selected entry and the call function. Directory control module 300 uses function module 310 to assemble a signal to send to the switch 130 that performs the call function using the phone number of the selected entry and the specified function.

Directory control module 300 also uses presentation module 330 to create 920 a signal to send to the phone. Again, this signal instructs the phone to present information. Here, however, the additional value is the filter signal. In this situation, presentation module 330 uses filter module 320 to filter the entries available for presentation (part 1 of directory context). Presentation module 330 then determines a set of five entries to display. In one embodiment, these entries are the first five entries in the list of (filtered) entries available for presentation.

When a user exits the directory (e.g., by activating a cancel key), a cancel signal is sent from the user's phone to server 110. When this signal is received, directory control module 300 ends execution.

Having described embodiments of a server with directory capabilities for a distributed telephony system (which are intended to be illustrative and not limiting), it is noted that modifications and variations can be made by persons skilled in the art in light of the above teachings. It is therefore to be understood that changes can be made in the particular embodiments of the invention disclosed that are within the scope and spirit of the invention as defined by the appended claims and equivalents.

What is claimed is:

1. A method comprising:
   receiving, from a phone, at a directory server comprising a processor and a memory, a request for a directory;
   generating and storing, at the directory server, a directory context associated with the phone, the directory context comprising (1) a part of the directory including one or more entries, (2) a first set of information associated with the one or more entries of the directory being displayed by the phone at the time of the request and (3) a call function associated with each of the one or more entries responsive to receiving the call function from the phone prior to the request for the directory;
   transmitting, from the directory server to the phone, a first display signal for displaying the directory context on the phone;
   receiving, from the phone, at the directory server, a navigation signal associated with navigation of the directory context; and
   transmitting, from the directory server to the phone, a second display signal responsive to the navigation signal, the second display signal associated with displaying on the phone a second set of information of the directory context that is independent and visually distinct from the first set of information.

2. The method of claim 1 wherein the directory context comprises a filter for determining the part of the directory associated with the phone.

3. The method of claim 1 wherein the directory context comprises a currently selected entry of the directory that is currently displayed on the phone.

4. The method of claim 1, further comprising:
   receiving a navigation direction comprising a desired direction of navigating the directory; and
   modifying the directory context based on the navigation direction.

5. The method of claim 1, further comprising:
   receiving a select signal including a selected entry from the part of the directory associated with the phone, the selected entry including a selected phone number; and
   inputting the selected phone number into the call function.

6. The method of claim 5, further comprising:
   receiving a call function signal including the call function; and
   transmitting, to a switch that performs the call function, the selected phone number and the call function.

7. The method of claim 5 wherein the call function comprises one from a group consisting of Dial, Transfer, Conference, PickUP, Park and Unpark.

8. The method of claim 1, further comprising:
receiving a filter signal comprising a user filter input;
modifying the directory context based on the user filter input; and
transmitting, to the phone, a presentation signal to display a portion of the modified directory context on the phone.

9. The method of claim 8, wherein the filter signal comprises a first filter number or filter character in an entry field of an entry in the directory context and modifying the directory context comprises modifying the directory context such that each remaining entry in the context includes a remaining field having a first number or character that matches the first filter number or filter character.

10. The method of claim 9 comprising:
receiving a second filter signal wherein the second filter signal comprises a second filter number or filter character in the entry field; and
further modifying the directory context such that the remaining field of each remaining entry has the first number or character that matches the first filter number or filter character and a second number or character that matches as the second filter number or character.

11. A directory server system for enabling a phone to display a directory, the system comprising:
a computer processor for executing programmed instructions;
a program memory, coupled to the processor, for storing program instruction steps for execution by the processor;
a phone interface module, executable by the processor in accordance with program instructions in the program memory, for receiving from the phone a request for the directory and a navigation signal associated with navigation of a directory context;
a presentation module, executable by the processor in accordance with program instructions in the program memory, coupled to the phone interface module, for transmitting a first display signal for displaying the directory context on the phone and subsequently transmitting to the phone, a second display signal responsive to the navigation signal, the second display signal associated with displaying on the phone a second set of information of the directory context that is independent and visually distinct from the first set of information;
a directory control module, executable by the processor in accordance with program instructions in the program memory, coupled to the phone interface module, for generating the directory context associated with the phone, the directory context comprising (1) a part of the directory including one or more entries, (2) a first set of information associated with the one or more entries of the directory being displayed by the phone at the time of the request and (3) a call function associated with each of the one or more entries responsive to receiving the call function from the phone prior to the request for the directory; and
a storage interface module, executable by the processor in accordance with program instructions in the program memory, coupled to the directory control module, configured to store the directory context on a storage.

12. The system of claim 11 wherein the directory control module is configured to generate the directory context using a filter for determining the part of the directory associated with the phone.

13. The system of claim 11 wherein the directory control module is configured to generate the directory context comprising a currently selected entry of the directory that is currently selected on the phone.

14. The system of claim 11 wherein the phone interface module is configured to receive a navigation direction comprising a desired direction of navigating the directory and the directory control module is configured to modify the directory context based on the navigation direction.

15. The system of claim 11 wherein the phone interface module is configured to receive a select signal including a selected entry from the part of the directory associated with the phone, the selected entry including a selected phone number, and the directory control module is configured to input the selected phone number into the call function.

16. The system of claim 15 wherein the phone interface module is configured to receive a call function signal including the call function and transmit, to a switch that performs the call function, the selected phone number and the call function.

17. The system of claim 11 wherein the phone interface module is configured to receive a filter signal comprising a user filter input and to transmit a presentation signal to display a portion of the modified directory context to the phone and the directory control module is configured to modify the directory context based on the user filter input.

18. The system of claim 17 wherein the filter signal comprises a first filter number or filter character in an entry field of an entry in the directory context and the directory control module is configured to modify the directory context such that each remaining entry in the context includes a remaining field whose first number or character matches the first filter number or filter character.

19. The method of claim 1 wherein the call function comprises one from a group consisting of Dial, Transfer, Conference, PickUP, Park and Unpark.

20. The system of claim 11 wherein the call function comprises one from a group consisting of Dial, Transfer, Conference, PickUP, Park and Unpark.

* * * * *